(12) United States Patent
Tei et al.

(10) Patent No.: US 6,442,324 B2
(45) Date of Patent: Aug. 27, 2002

(54) OPTICAL ATTENUATOR AND OPTICAL ATTENUATOR MODULE

(75) Inventors: Daikou Tei, Seto; Naoyuki Mekada; Masaharu Okada, both of Komaki, all of (JP)

(73) Assignee: Santec Corporation, Komaki (JP)

( * ) Notice: Subject to any disclaimer, the term of this patent is extended or adjusted under 35 U.S.C. 154(b) by 0 days.

(21) Appl. No.: 09/920,950

(22) Filed: Aug. 3, 2001

Related U.S. Application Data

(62) Division of application No. 09/361,171, filed on Jul. 27, 1999, now Pat. No. 6,292,616.

(30) Foreign Application Priority Data

Aug. 4, 1998 (JP) ............................................. 10-220137

(51) Int. Cl.$^7$ ................................................ G02B 6/00
(52) U.S. Cl. ........................... 385/140; 385/33; 385/47; 359/127; 359/227
(58) Field of Search .............................. 385/140, 18–19, 385/33, 47; 359/127, 227, 233, 236

(56) References Cited

U.S. PATENT DOCUMENTS

| | | | |
|---|---|---|---|
| 5,018,833 A | * 5/1991 | Bennett et al. ............. | 385/140 |
| 5,325,459 A | 6/1994 | Schmidt | |
| 5,745,634 A | 4/1998 | Garrett et al. | |
| 5,805,759 A | 9/1998 | Fukushima | |
| 5,900,983 A | 5/1999 | Ford et al. | |
| 5,999,305 A | * 12/1999 | Fukushima ................ | 385/140 |
| 6,130,984 A | 10/2000 | Shen et al. | |
| 6,222,656 B1 | * 4/2001 | Eu ............................. | 385/140 |
| 6,304,709 B1 | * 10/2001 | Fujita ........................ | 385/140 |

FOREIGN PATENT DOCUMENTS

| | | | |
|---|---|---|---|
| JP | 54-94055 | * | 7/1979 |
| JP | 62-11822 | | 1/1987 |

* cited by examiner

*Primary Examiner*—Frank G. Font
*Assistant Examiner*—Sang H. Nguyen
(74) *Attorney, Agent, or Firm*—McDermott, Will & Emery

(57) ABSTRACT

In order to realize an optical attenuator which has an attenuation factor independent of the wavelength of incident light, a glass substrate is used in an attenuator plate, and the glass substrate is formed in a tapered section so that its incident and exit planes may not be parallel to each other. On one side thereof, a metal film corresponding to the attenuation factor is formed. Also one side of the glass substrate is covered with an antireflection coating for canceling the wavelength dependence of the metal film. Thereby ripple of attenuation factor due to wavelength can be eliminated, and the wavelength dependence may be minimized.

8 Claims, 10 Drawing Sheets

OPTICAL ATTENUATOR AND OPTICAL ATTENUATOR MODULE

This application is a divisional of application Ser. No. 09/361,171 filed Jul. 27, 1999, now U.S. Pat. No. 6,292,616.

FIELD OF THE INVENTION

The present invention relates to an optical attenuator and an optical attenuator module for attenuating the intensity of light by a specific amount used in optical communication system or the like.

PRIOR ART

Various devices have been proposed so far as optical attenuators used in optical communication systems or the like. Among conventional optical attenuators, an optical device of electric, magnetic or thermo-optical crystal is inserted between optical fibers, and its transmissivity is changed, or a lens is disposed between optical fibers, and a necessary attenuation is obtained by making use of the interval or axial deviation. Other optical attenuator using an attenuator plate between optical fibers has also been proposed.

In such conventional optical attenuators, however, accurate attenuation factor or stability could not be obtained. That is, the attenuator which attenuates by incident light the interval or axial deviation of two optical fibers did not have enough stability and attenuation factor of a high resolution. Or, in the constitution of inserting a device of electric, magnetic or thermo-optic crystal between optical fibers, insertion loss or dependence on plane of polarization may be involved, and it is hard to obtain a desired attenuation factor. In the type of using an attenuator plate, since the attenuation factor varies depending on the wavelength of incident light, it is impossible to obtain a specific attenuation factor regardless of wavelength.

SUMMARY OF THE INVENTION

The invention is devised in the light of the problems of the prior arts, and purposes to provide an optical attenuator capable of obtaining a desired attenuation factor, without depending on the wavelength in a specific wavelength range, and an optical attenuator module using the same.

An attenuator of the invention comprises a transparent glass substrate with a specific taper so that the incident plane and exit plane may not be parallel to each other, and a metal film formed on one side of the transparent glass substrate for attenuating the incident light by a specific attenuation factor. It hence eliminates fine ripple of attenuation factor depending on wavelength, and a desired attenuation characteristic is obtained.

Moreover, antireflection coating may be provided on at least one side of the transparent glass substrate. The antireflection coating is intended to compensate for wavelength dependence of attenuation factor due to the metal film, and it has the reverse characteristic of the dependence of the metal film on wavelength in the operating wavelength range, and the entire attenuation factor of the optical attenuator may not depend on the wavelength.

A preferred aspect of the invention is a variable type optical attenuator for attenuating the incident light so that the attenuation factor may vary depending on the incident position, which comprises a transparent glass substrate with a specific taper so that the incident plane and exit plane may not be parallel to each other, a metal film formed on one side of the transparent glass substrate for attenuating the incident light by a specific attenuation factor depending on the incident position, and an antireflection coating provided on at least one side of the transparent glass substrate for compensating for wavelength dependence of attenuation factor due to the metal film. By changing the film thickness of the metal film in a specific direction, the attenuation factor can be changed corresponding to the incident position. In this case, the wavelength dependence can be eliminated by the antireflection coating.

When such optical attenuator is combined with a first optical branching unit for branching part of incident light and sending the rest into the optical attenuator, a second optical branching unit for branching part of the light passing through the optical attenuator, and passing the rest, first and second photo detectors for receiving the lights branched by the first and second optical branching units respectively, a level detector for detecting the reception level of the first and second photo detectors, and a display unit for displaying the reception level detected by the level detector, an optical attenuator module is constituted.

Further, using an optical attenuator changing in the attenuation factor depending on the incident position, an optical attenuator module can be composed together with an incident position adjusting unit for changing the position of the light entering the optical attenuator. Thus, the attenuation factor can be controlled depending on the incident position.

Moreover, combining this optical attenuator module with an attenuation factor calculator and a feedback control unit for changing the incident position by the incident position adjusting unit so that the calculated attenuation factor may be a preset attenuation factor, it is possible to adjust to the preset attenuation factor.

DESCRIPTION OF THE PREFERRED EMBODIMENTS

Figure 1:
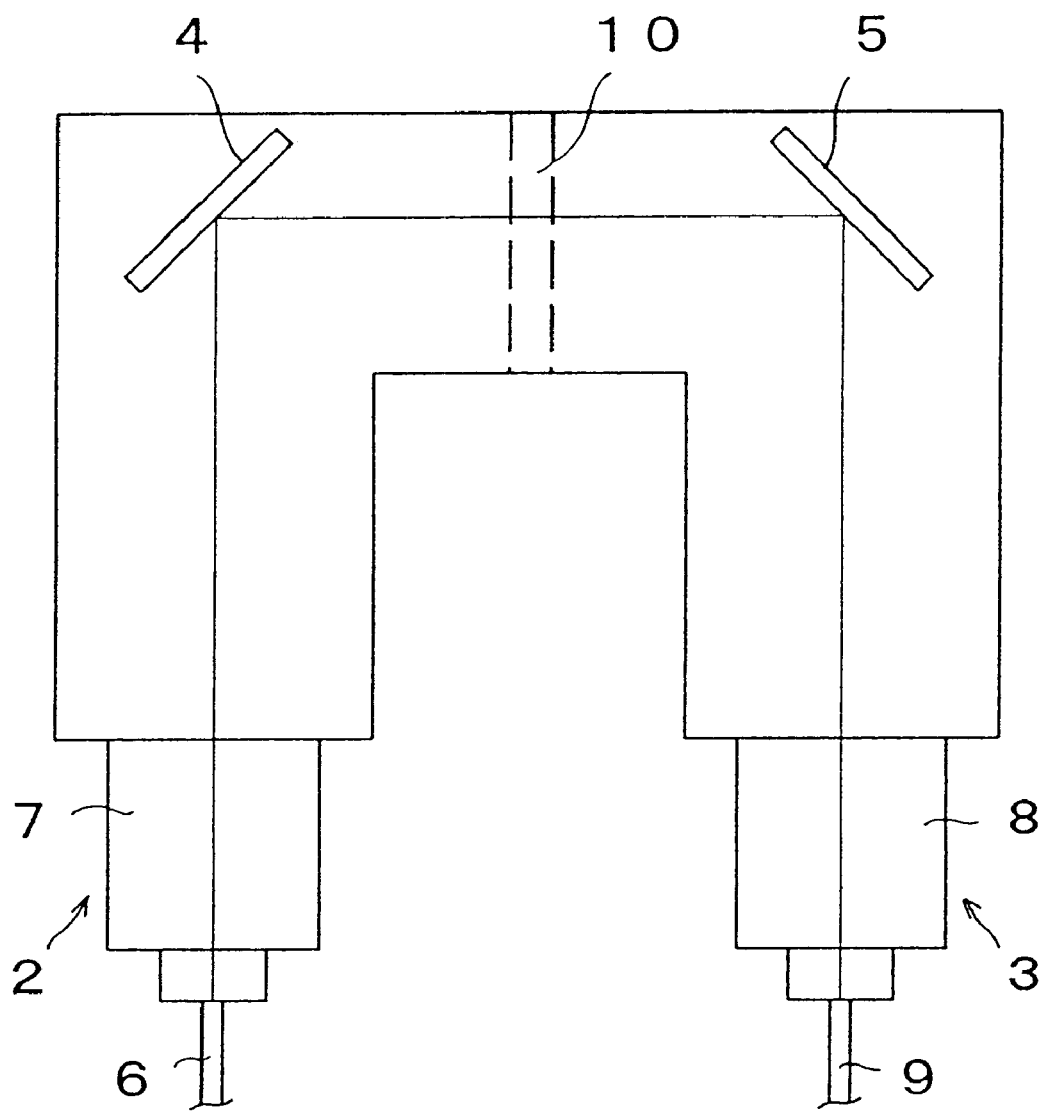
FIG. 1 is a schematic diagram showing a constitution of an attenuator module in a first embodiment of the invention.

FIG. 1 is a schematic diagram showing a constitution of an optical attenuator module in a first embodiment of the invention. In the diagram, a U-frame 1 is a U-shaped frame folded a tubular member, and its central axis is the optical axis. A pair of optical fiber coupling members 2 and 3 are provided at the both sides of the U-frame. Inside the U-frame 1, as shown in the drawing, as first and second light reflecting units, mirrors 4 and 5 are disposed and fixed at an angle of 45 degrees to the incident light axis and exit light axis. The optical fiber coupling member 2 is provided with an incident side optical fiber 6, and sends the incident light from the optical fiber 6 into the mirror 4 through a collimator 7. The mirror 4 reflects the incident light from the optical fiber 6 to the mirror 5, and the mirror 5 reflects the exit light from the mirror 4 to the optical fiber coupling member 3. A focusing lens 8 and an exit side optical fiber 9 are attached to the optical fiber coupling member 3.

An attenuator plate 10 is disposed between the mirrors 4 and 5 in the central part of the U-frame 1. The attenuator plate 10 is a flat plate of a nearly square shape as shown in the perspective view in FIG. 2(a) and a side view in FIG. 2(b). The attenuator plate 10 has a transparent glass substrate 11, both sides thereof are incident plane and exit plane. The both sides of the glass substrate 11 are not parallel to each other, and as shown in the side view in FIG. 2(b), for example, one side has a taper shape inclined, for example, by 0.5 to 1 degree from the parallel plane. As shown in the magnified sectional view in FIG. 2(c), its both sides are applied with antireflection coating 12a and 12b. Further, on either one of the sides, a metal film 13 of a thickness corresponding to the attenuation factor of the attenuator plate 10 is formed. This metal film is a metal film of chromium, Incanel, gold, or the like. The metal film 13 is formed in a thickness corresponding to the attenuation factor by various methods such as evaporation, sputtering, or plating.

Figure 3A:
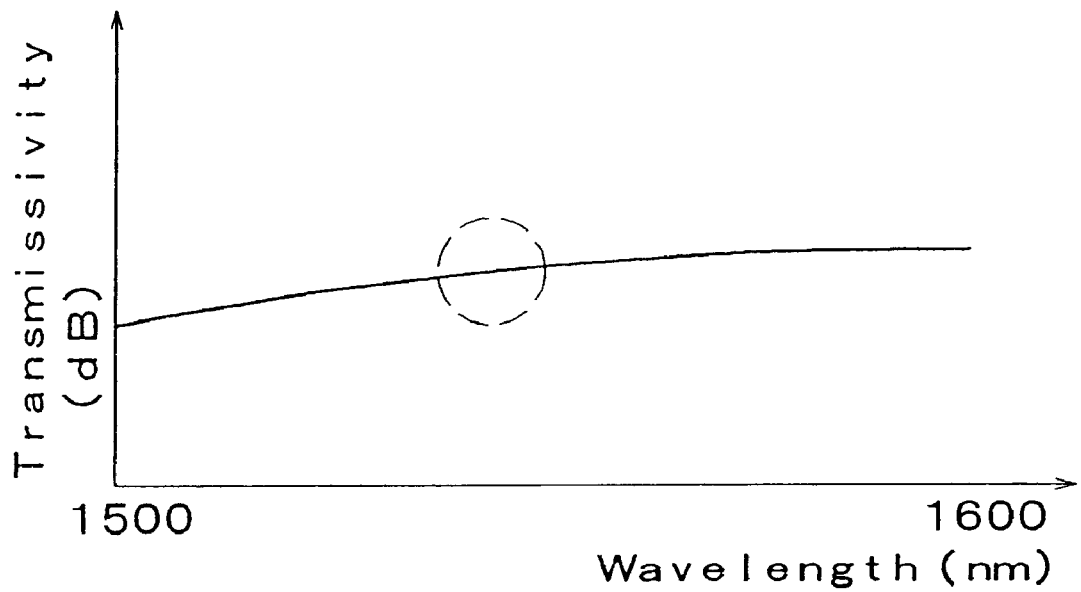
FIG. 3(a) is a graph showing the characteristic of an attenuator used in a prior art.
Figure 3B:
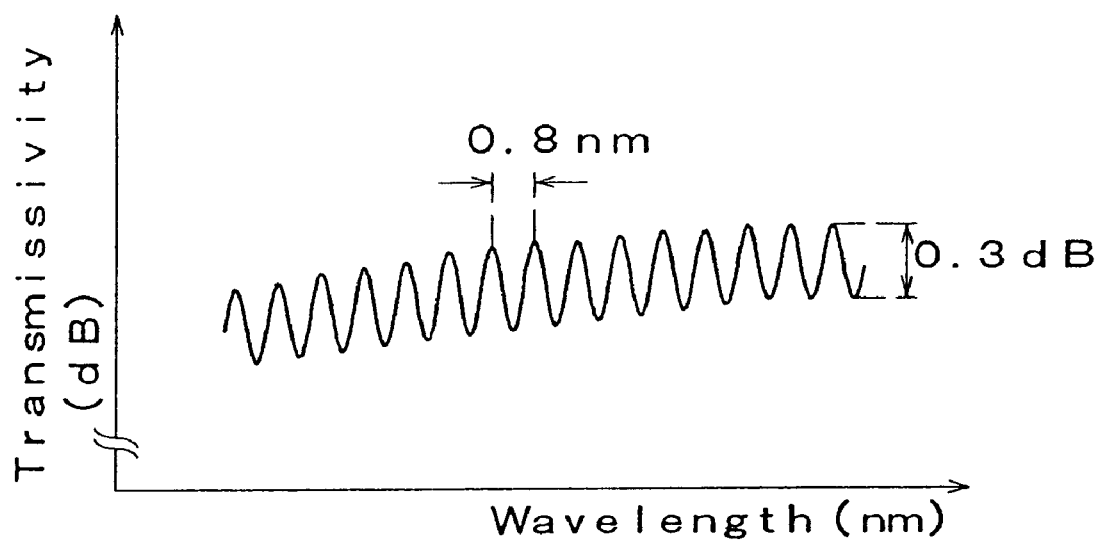
FIG. 3(b) is its magnified view.

The characteristic of the attenuator plate 10 is described below while referring to the conventional attenuator. Herein, the conventional attenuator plate is prepared by forming a metal film in a thickness corresponding to the attenuation factor on a glass substrate of a same shape of parallel flat plate. FIG. 3(a) shows changes of transmissivity of the wavelength using the optical attenuator to the wavelength of the incident light, by entering light of a specific level into the conventional attenuator plate in a range of, for example, 1500 to 1600 nm. The sum of the transmissivity and the attenuation factor is 1 by ignoring the light absorption. It is hard to manufacture the attenuator plate so that the transmissivity may have a flat specific characteristic to the wavelength, and if the wavelength is longer, as shown in the drawing, the transmissivity rises slightly. This rising rate is, for example, about 0.2 dB/50 nm. In the case of a conventional attenuator plate composed of a glass plate of a parallel flat plate, even if the light enters the attenuator plate at a slight inclination from the vertical direction, part of the light is reflected on the incident plane and exit plane, and interference of light occurs. That is, as shown by broken line in FIG. 3(b) which is a magnified view of the circular portion of FIG. 3(a), it can be confirmed by ripple of transmissivity at 0.3 dB. (p-p) in a cycle of wavelength of about 0.8 nm. In conventional applications using such conventional attenuator plate, fluctuations of such level hardly caused problems.

Figure 2A:
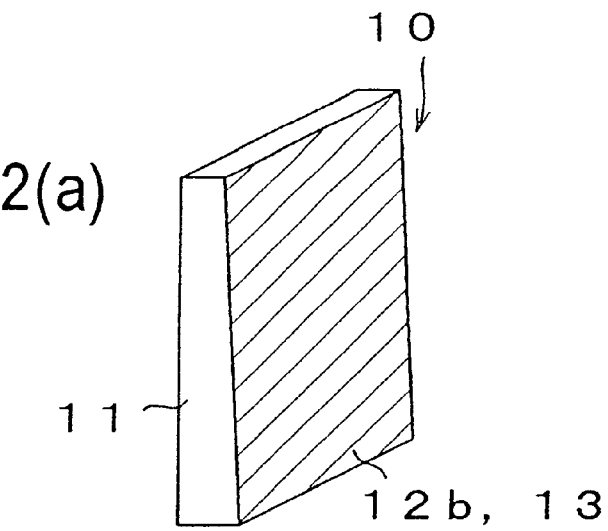
FIG. 2(a) is a perspective view showing an attenuator plate in the first embodiment.
Figure 2B:
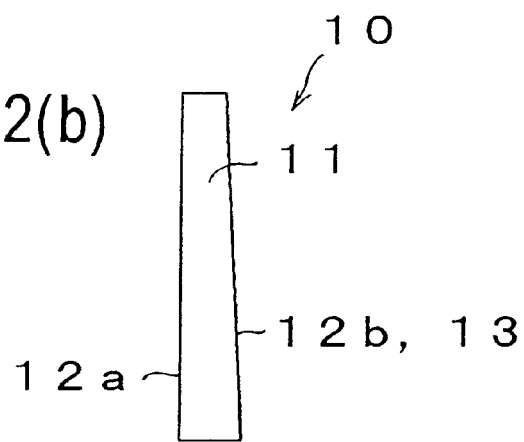
FIG. 2(b) is its side view.
Figure 2C:
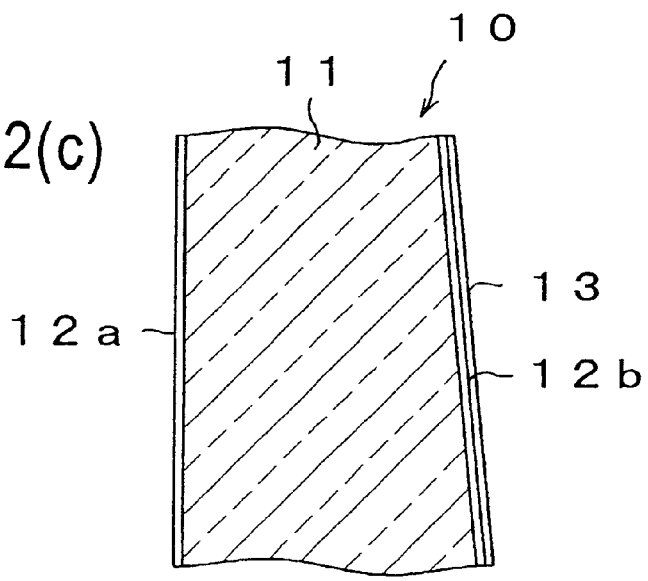
FIG. 2(c) is its partially magnified sectional view.
Figure 4A:
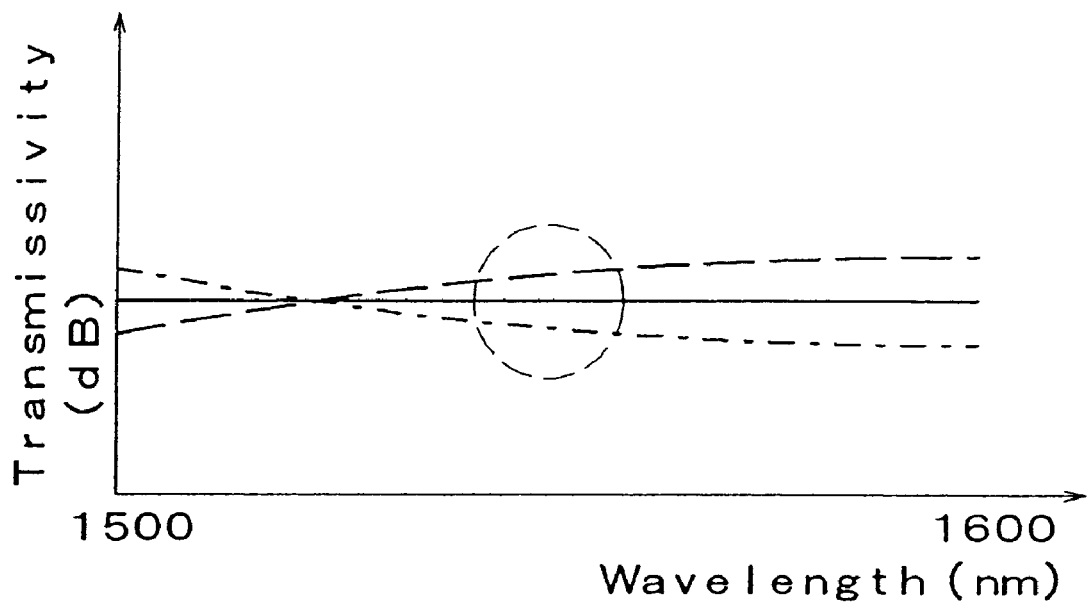
FIG. 4(a) is a graph showing the characteristic of the attenuator used in the first embodiment of the invention.
Figure 4B:
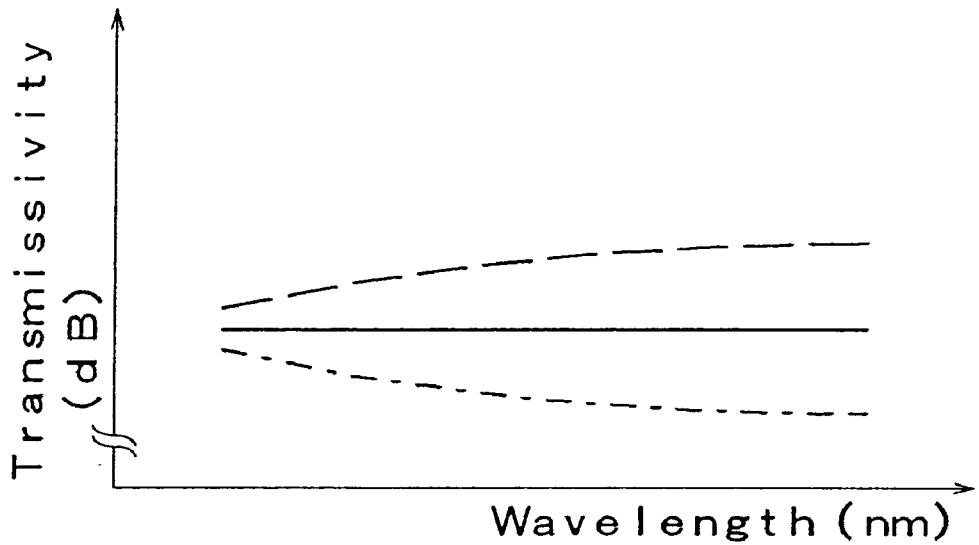
FIG. 4(b) is its magnified view.

FIG. 4(a) is a graph showing changes of transmissivity of the wavelength using the optical attenuator plate 10 of the embodiment corresponding to the wavelength of the incident light, by entering light of a specific level and wavelength in a range of, for example, 1500 to 1600 nm. The solid line shows the characteristic of the attenuator plate 10 of this embodiment, and the broken line refers to application of an ordinary antireflection coating. In the optical attenuator 10 of the embodiment, to prevent fluctuations of transmissivity of such minor level due to interference, as shown in FIGS. 2(a) and (b), one side of the glass substrate 11 is not parallel to the other side, but is tapered at an inclination in a range of, for example, 0.5 to 1 degree. Accordingly, from whichever direction the light may enter, interference does not occur inside the attenuator plate. This is also confirmed by substantial decrease of ripple component as shown in the magnified view of circular portion in FIG. 4(b).

Figure 5:
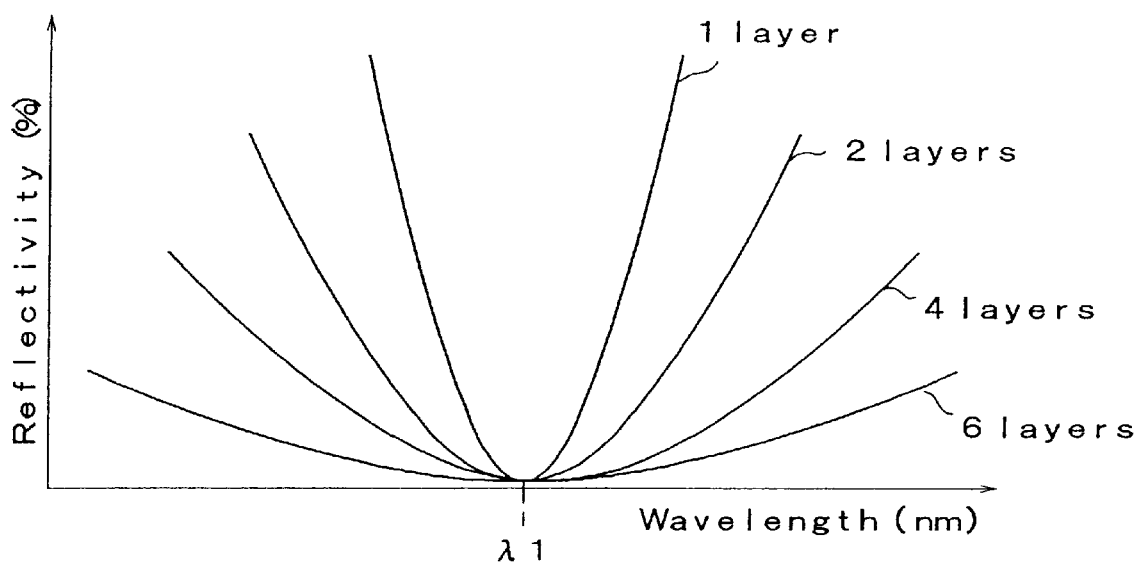
FIG. 5 is a graph showing an example of reflection characteristic of number of layers and wavelength of antireflection coating.

Further, as shown in FIG. 3(a), in the conventional optical attenuator, as the wavelength changes to the longer wavelength side, the transmissivity rises gradually. Accordingly, in the variable attenuator plate 10 of the embodiment, one antireflection coating 12a is an ordinary antireflection coating, and other antireflection coating 12b is a coating having a reverse characteristic of this characteristic so as to cancel the wavelength dependence. The antireflection coating is formed same as an interference filter of a single layer or multiple layers of thin film. The multilayer film is formed by laminating about two layers to six layers of high refractive index film and low refractive index film alternately depending on the operating wavelength range, and may be varied in characteristic by changing its optical thickness. As the high refractive index film and low refractive index film, for example, $SiO_2$ (refractive index n=1.46), $Ta_2O_5$ (n=2.15) and Si (n=3.45) may be used. By varying the number of layers or the optical thickness, the wavelength dependence of the central wavelength or reflectivity may be changed. FIG. 5 shows that the curve of reflectivity varies depending on the number of layers of low refractive index film and high refractive index film, and this central wavelength $\lambda$ 1 can be changed by the thickness of the layer. Therefore, the number of layers and the film thicknesses of high refractive index and low refractive index are selected and used so as to compensate the wavelength characteristic of the attenuator plate as indicated by broken line in FIG. 4(a), that is, so as to obtain the reverse characteristic indicated by single dot chain line. Herein, the antireflection coating 12b is a coating of four layers, and its central wavelength is a shorter wavelength than the operating wavelength. Thereby a reverse characteristic is obtained by making use of the characteristic of its skirt portion. As a result, the transmissivity is lower at 1600 nm than at 1500 nm. The central wavelength of the other antireflection coating 12a is same as the operating wavelength, so that the antireflection coating is free from wavelength dependence. On the whole, therefore, as indicated by solid line in FIG. 4(a), the attenuation factor of the attenuator plate 10 is small in wavelength dependence and almost free from ripple component. For example, the wavelength dependence may be 0.1 dB or less in a range of 1500 to 1600 nm.

Figure 8A:
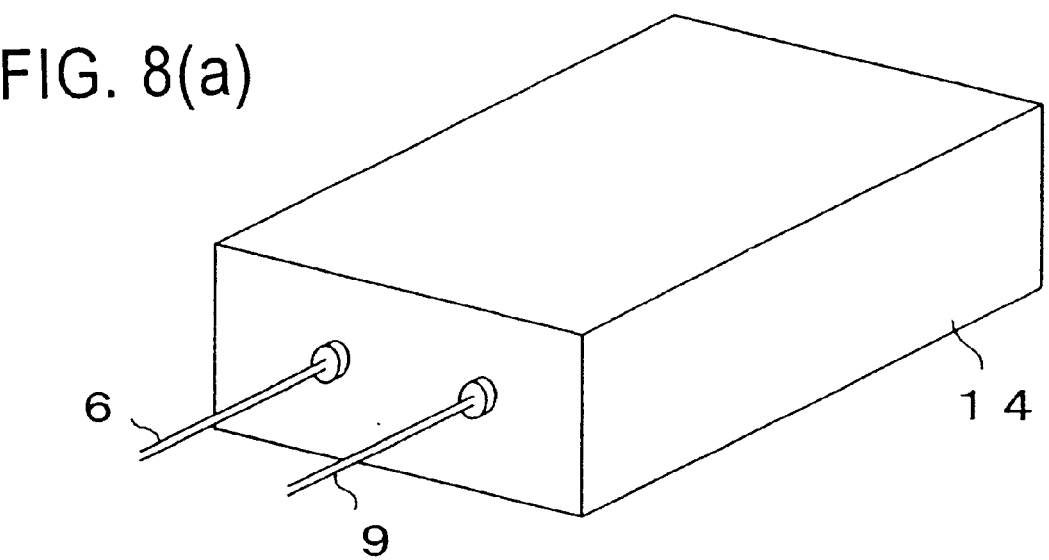
FIG. 8(a) is a perspective view showing the appearance of the attenuator module in the first embodiment of the invention.

Thus constituted optical attenuator plate 10 is fixed in the U-frame 1, and is assembled into a case 14 as shown in FIG. 8(a), and an optical attenuator module is composed. Only pair of optical fibers 6, 9 can be connected from outside the module. As a result, the optical attenuator module has constant transmissivity and attenuation factor without depending on the operating wavelength range.

In this embodiment, meanwhile, the glass substrate 11 is tapered, and antireflection coating of reverse characteristic corresponding to the metal film is applied, but when the operating wavelength range is narrow, only the glass substrate may be tapered, and a metal film corresponding to the attenuation factor may be applied. In this manner, in a narrow wavelength range, an optical attenuator small in ripple component can be obtained.

Figure 6:
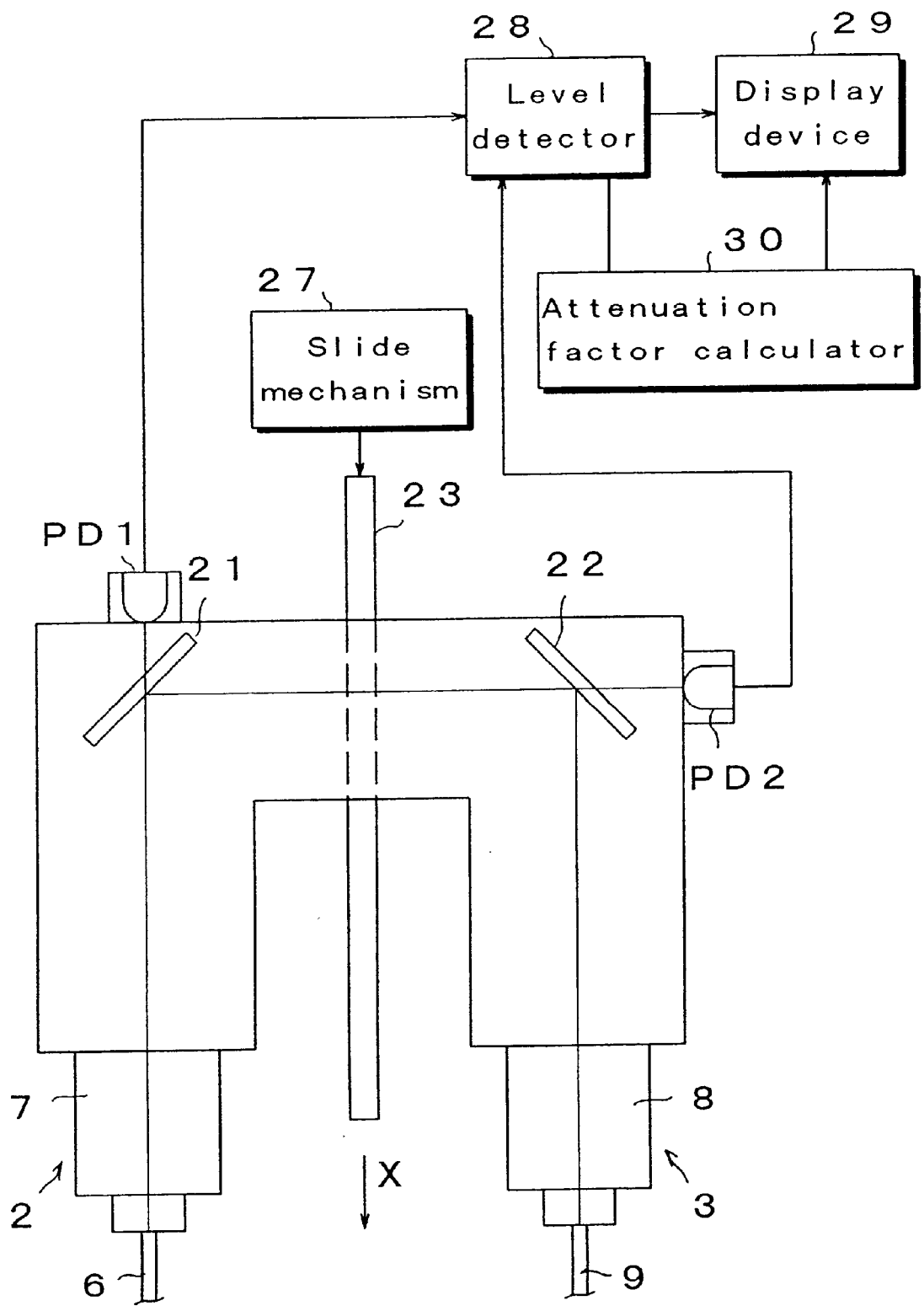
FIG. 6 is a schematic diagram showing a constitution of an attenuator module in a second embodiment of the invention.
Figure 7A:
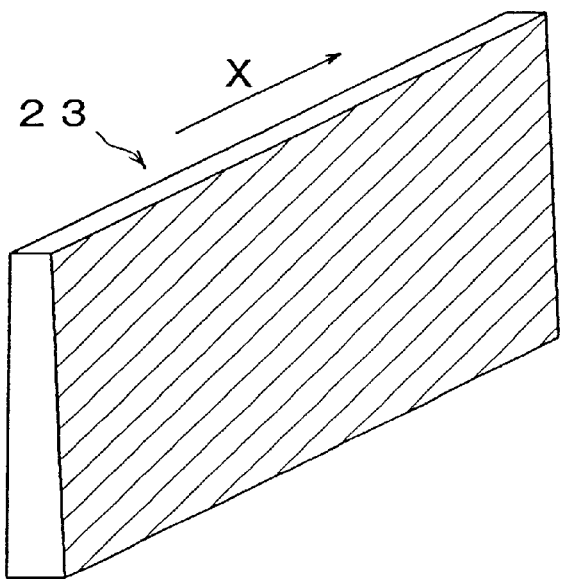
FIG. 7(a) is a perspective view of an attenuator plate used in the second embodiment of the invention.
Figure 7B:
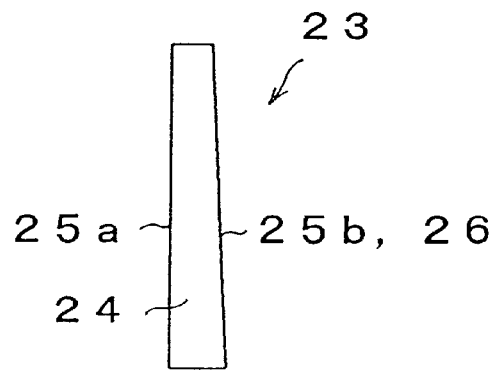
FIG. 7(b) is its side view.
Figure 8B:
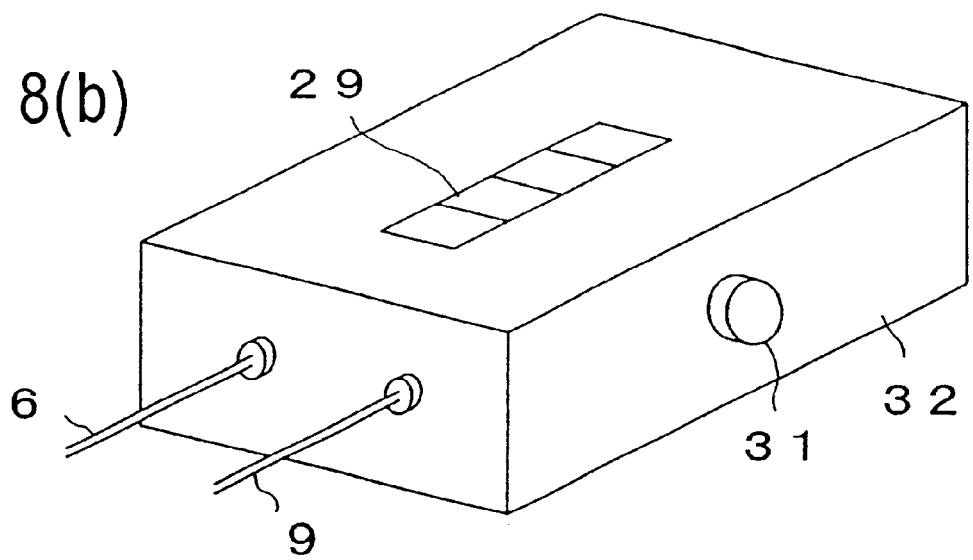
FIG. 8(b) is a perspective view showing the appearance of the attenuator module in the second embodiment.

A second embodiment of the invention is described below. FIG. 6 is a schematic diagram showing a constitution of an optical attenuator module in a second embodiment. In the diagram, same parts as in the first embodiment are identified with same reference numerals, and duplicate description is omitted. In this embodiment, the U-frame 1 is provided with a pair of optical fiber coupling members 2, 3, and further an optical fiber 6, a collimator 7, a focusing lens 8, and an optical fiber 9 are attached. In this embodiment, instead of the inside mirrors 4 and 5 in the U-frame 1, first and second optical branching units for passing part of the incident light and reflecting the rest, for example, beam splitters 21 and 22 are disposed. The beam splitters 21 and 22 have preferably the identical characteristics, for example, passing 5% of the incident light and reflecting 95% of the light. Between these beam splitters 21, 22, a rectangular variable attenuator plate 23 is disposed so as to move along its longitudinal direction. In the variable attenuator plate 23, as shown in the perspective view in FIG. 7(a) and side view in FIG. 7(b), the section of a glass substrate 24 is formed in a taper same as in the first embodiment. One surface of this glass substrate 24 is inclines to the other in a range of 0.5 to 1 degree. The both sides are applied with antireflection coatings 25a, 25b, respectively. Moreover, a metal film 26 is formed on the glass substrate 24 so as to change in the attenuation factor depending on the incident position. The film thickness of this metal film 26 preferably changes continuously so that the attenuation factor may change continuously along the X-axis direction in FIG. 7(a), that is, the longitudinal direction. At a position close to the U-frame 1, a slide mechanism 27 is provided as an incident position adjusting unit for shifting this variable attenuator plate 23 continuously in the longitudinal direction. The slide mechanism 27 is a mechanism of sliding the variable attenuator plate 23 in the X-axis direction. For example, by mechanical parts such as rack and pinion and a knob 31, it is intended to slide the variable attenuator plate 23 in the X-axis direction from outside of the case 32 in FIG. 8(b).

A photo diode PD1 as first photo detector and a second photo diode PD2 as second photo detector are disposed at the positions for receiving the lights passing through the beam splitters 21, 22 of the U-frame 1, respectively. The photo diode PD1 detects part of the incident light to the variable attenuator plate 23, and the photo diode PD2 detects part of the exit light. A level detector 28 receives the outputs of the photo diodes PD1, PD2. The level detector 28 detects the level and ratio of the incident light and exit light, and sends the results to a display unit 29 and an attenuation factor calculator 30. The attenuation factor calculator 30 calculates the attenuation factor by the ratio. The display unit 29 displays the level and attenuation factor of the incident and exit lights. As far as the beam splitters 21, 22 have the identical reflectivity and transmissivity characteristics as mentioned above, the ratio can be determined directly, and the attenuation factor can be calculated. If the transmissivity and reflectivity of the beam splitter 21 are not identical with those of the beam splitter 22, it is necessary to determine the attenuation factor by correcting either one output.

In the second embodiment, the attenuation factor is set from outside of the case through the knob 31 of the slide mechanism 27. Accordingly, depending on the desired attenuation level, the variable attenuator plate 23 can be moved in the longitudinal direction, and a desired attenuation amount is obtained. In this case, the display unit 29 displays the incident level, exit level, and actual attenuation factor calculated in the attenuation factor calculator 30, so that it is possible to check and adjust the values if necessary. Such structure makes the optical attenuator module easy to operate.

In this embodiment, using the rectangular variable attenuator plate 23, the attenuation factor is varied depending on the incident position. Therefore, for example, the attenuation factor is set at 0 dB, at one end of the variable attenuator plate 23 at 10 dB in the middle, and at 20 dB at other end thereof. In this case, the transmissivity is not always specific in the operating wavelength range, and the width of its change increases with respect to the attenuation factor. Therefore, in order to keep constant the transmissivity when entering, for example, in the middle, it is preferred to cover the entire glass substrate with antireflection coating of reverse characteristic.

In this optical attenuator module, instead of the variable attenuator plate 23, the attenuator plate 10 shown in FIG. 1 may be used and the slide mechanism can be omitted. As a result, the attenuation factor to the incident light can be displayed in the display unit 29.

Figure 9:
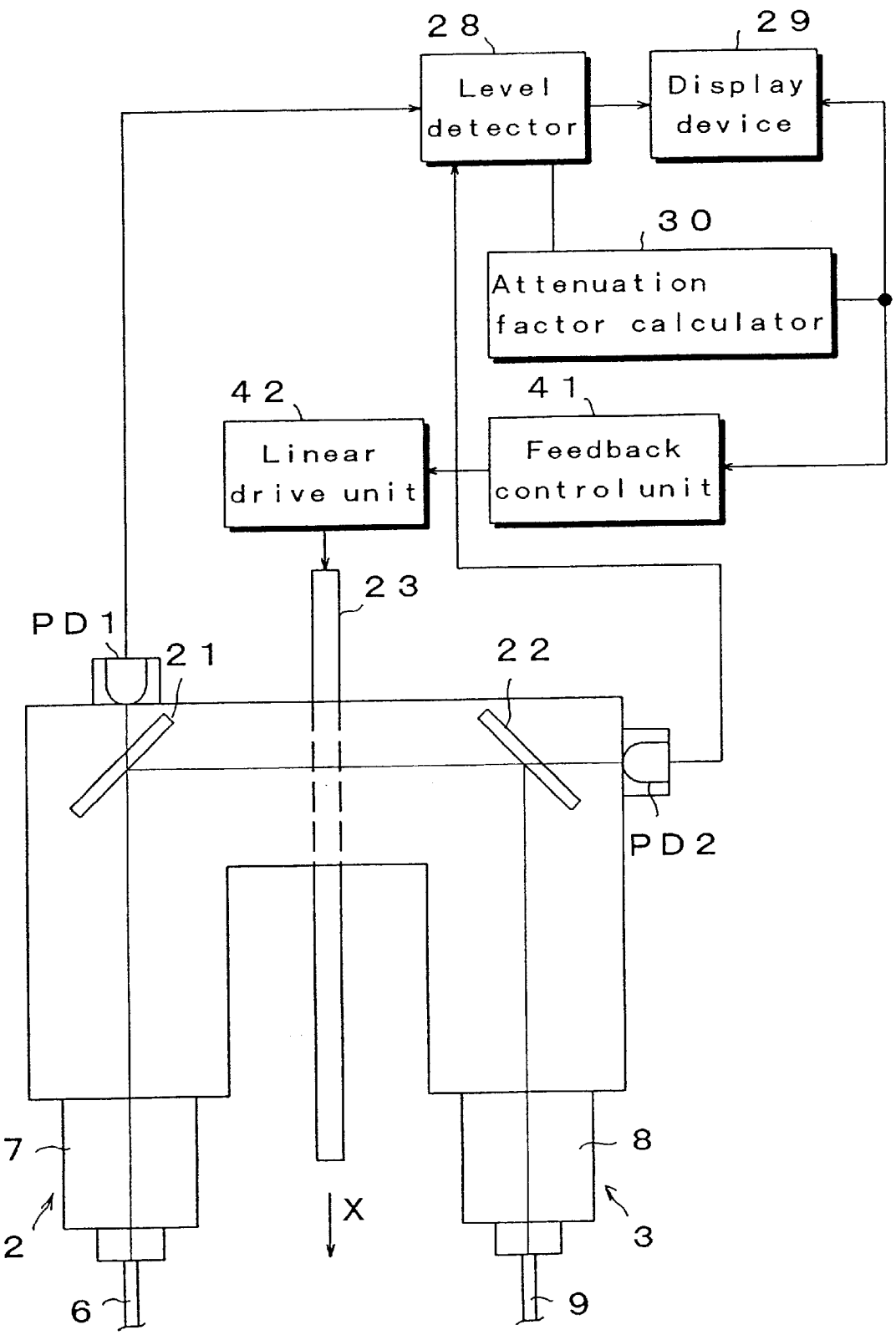
FIG. 9 is a schematic diagram showing a constitution of an attenuator module in a third embodiment of the invention.

A third embodiment of the invention is described by referring to FIG. 9. In this embodiment, in addition to the second embodiment, the signal of attenuation factor detected in the attenuation factor calculator 30 is given to a feedback control unit 41, and the incident position of the variable optical attenuator 23 is adjusted so that the attenuation factor may be a specified value according to this signal. In this case, instead of the slide mechanism 27, it requires a linear drive unit 42 for driving the variable optical attenuator 23 in the X-axis direction by an input signal. The other constitution is the same as in the second embodiment, and detailed description is omitted. By such feedback control, the attenuation factor can be controlled more accurately.

Figure 10A:
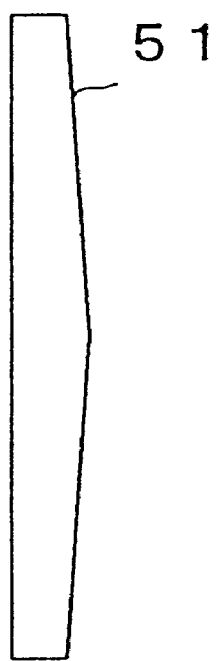
FIG. 10(a) is a side view showing a constitution of an attenuator plate used in other embodiment of the invention.
Figure 10B:
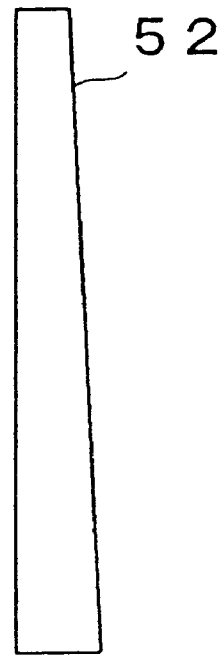
FIG. 10(b) is a side view showing a constitution of an attenuator plate used in another embodiment of the invention.

In the second and third embodiments, the variable attenuator plate 23 is composed of a rectangular glass substrate, but it may be also composed of a circular glass substrate. In this case, too, in order that the incident plane and exit plane may not be parallel to each other, a conical glass substrate 51 of an extremely large vertex angle may be used as shown in FIG. 10(a). Or, as shown in FIG. 10(b), a circular glass substrate 52 having a tapered section on the whole may be used to compose the variable attenuator plate. In this case, the attenuation factor may be changed along the circumferential direction, and by using a rotary drive unit instead of slide mechanism or linear drive unit, it is easier to change the incident position of the light. Herein, in order to keep the transmissivity constant, the entire glass substrate may be covered with antireflection coating of reverse characteristic of the metal film.

In the second and third embodiments, the variable attenuator plate 23 is designed so that the transmissivity may change continuously in a specified direction, but the transmissivity may be discontinuous, and the incident position can be changed so as to be set at the position of a desired attenuation factor.

In the first to third embodiments, by expanding the diameter of the light through the collimator lens and the beam splitter or the mirror, the circular laser light is entered into the attenuator plate 10 or the variable optical attenuator 23. Thus, the light intensity per unit area passing through the attenuator plate is smaller, and secular changes of metal film can be decreased.

What we claim is:

1. An optical attenuator comprising:
   a transparent glass substrate having a specified taper so that an incident plane and exit plane may not be parallel to each other;
   a metal film formed on one side of said transparent glass substrate, for attenuating an incident light by a specified attenuation factor; and
   an antireflection coating applied at least on one side of said transparent glass substrate, for compensating for wavelength dependence of attenuation factor due to said metal film,
   wherein said transparent glass substrate is constituted so as to incline in a range of 0.5 to 1 degree from the parallel state of one side to other side.

2. An optical attenuator of claim 1,
   wherein said antireflection coating for compensation is formed by laminating two to six layers of high refractive index film and low refractive index film alternately.

3. An optical attenuator comprising:
   a transparent glass substrate having a specified taper so that an incident plane and exit plane may not be parallel to each other; and
   a metal film formed on one side of said transparent glass substrate, for attenuating an incident light by a specified attenuation factor,
   wherein said metal film attenuates the incident light at an attenuation factor depending on the incident position.

4. An optical attenuator of claim 3,
   wherein said metal film is designed to change the attenuation factor continuously depending on the incident position along a specified direction of said transparent glass substrate.

5. An optical attenuator of claim 3, further comprising an antireflection coating applied at least on one side of said transparent glass substrate, for compensating for wavelength dependence of attenuation factor due to said metal film.

6. An optical attenuator of claim 3, wherein said antireflection coating for compensation is formed by laminating two to six layers of high refractive index film and low refractive index film alternately.

7. An optical attenuator module comprising:
   a first light reflecting unit for reflecting incident light;
   an optical attenuator composed of a transparent glass substrate having a specified taper so that an incident plane and exit plane may not be parallel to each other, and a metal film formed on one side thereof for attenuating a light reflected by said first light reflecting unit by a specified attenuation factor; and
   a second light reflecting unit for reflecting the light passing through said optical attenuator,
   wherein said optical attenuator further comprises an antireflection coating applied at least on one side of said transparent glass substrate for compensating for wavelength dependence of attenuation factor due to said metal film, and
   wherein said transparent glass substrate is constituted so as to incline in a range of 0.5 to 1 degree from the parallel state of one side to other side.

8. An optical attenuator comprising:
   a transparent glass substrate having a specified taper so that an incident plane and exit plane may not be parallel to each other;
   a metal film formed on one side of said transparent glass substrate, for attenuating an incident light by a specified attenuation factor; and
   an antireflection coating applied at least on one side of said transparent glass substrate, for compensating for wavelength dependence of attenuation factor due to said metal film,
   wherein said transparent glass substrate is constituted so as to incline in a range of 0.5 to 1 degree from the parallel state of one side to other side,
   wherein said metal film attenuates the incident light at an attenuation factor depending on the incident position, and
   wherein said antireflection coating for compensation is formed by laminating two to six layers of high refractive index film and low refractive index film alternately.

* * * * *